Patented May 16, 1933

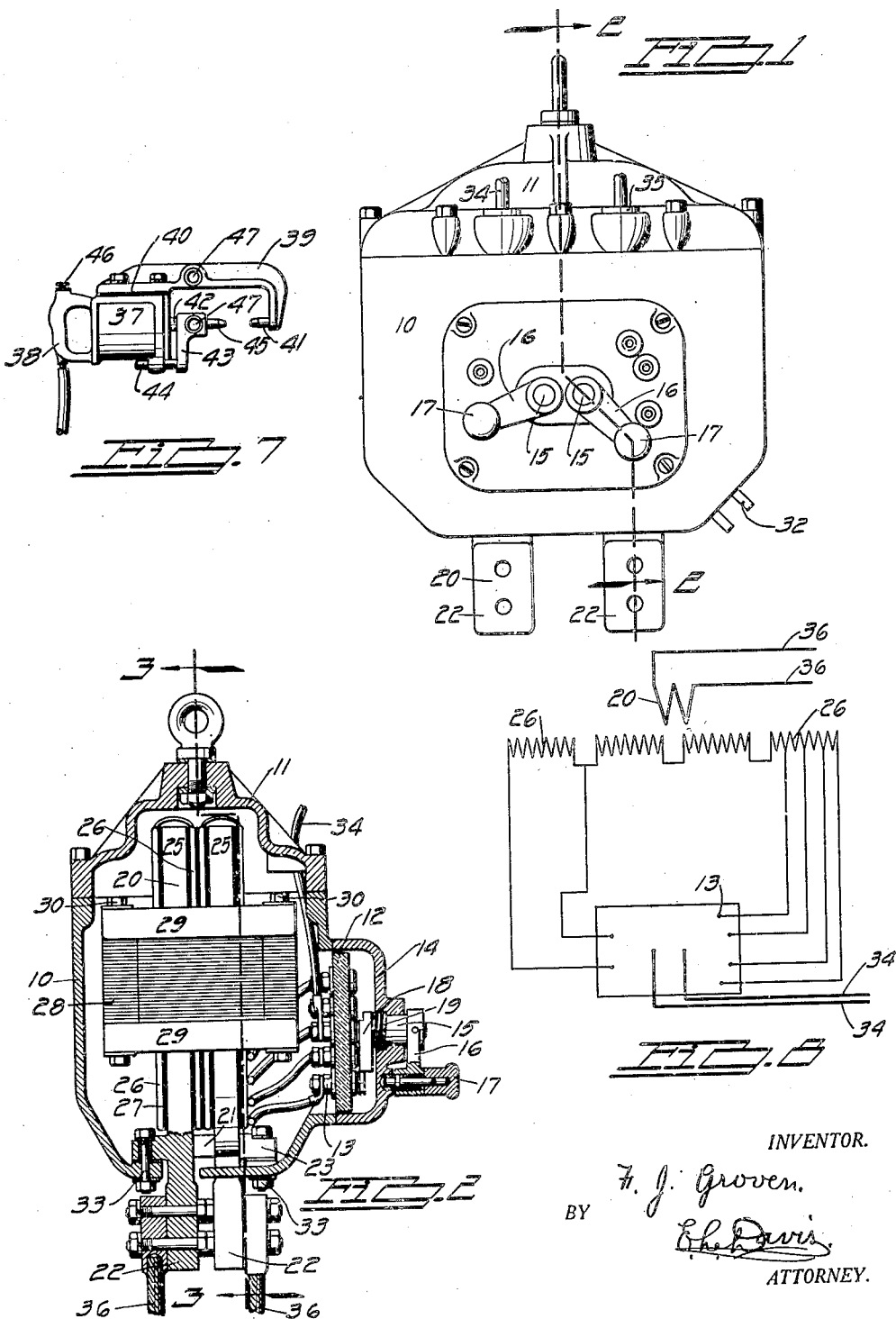

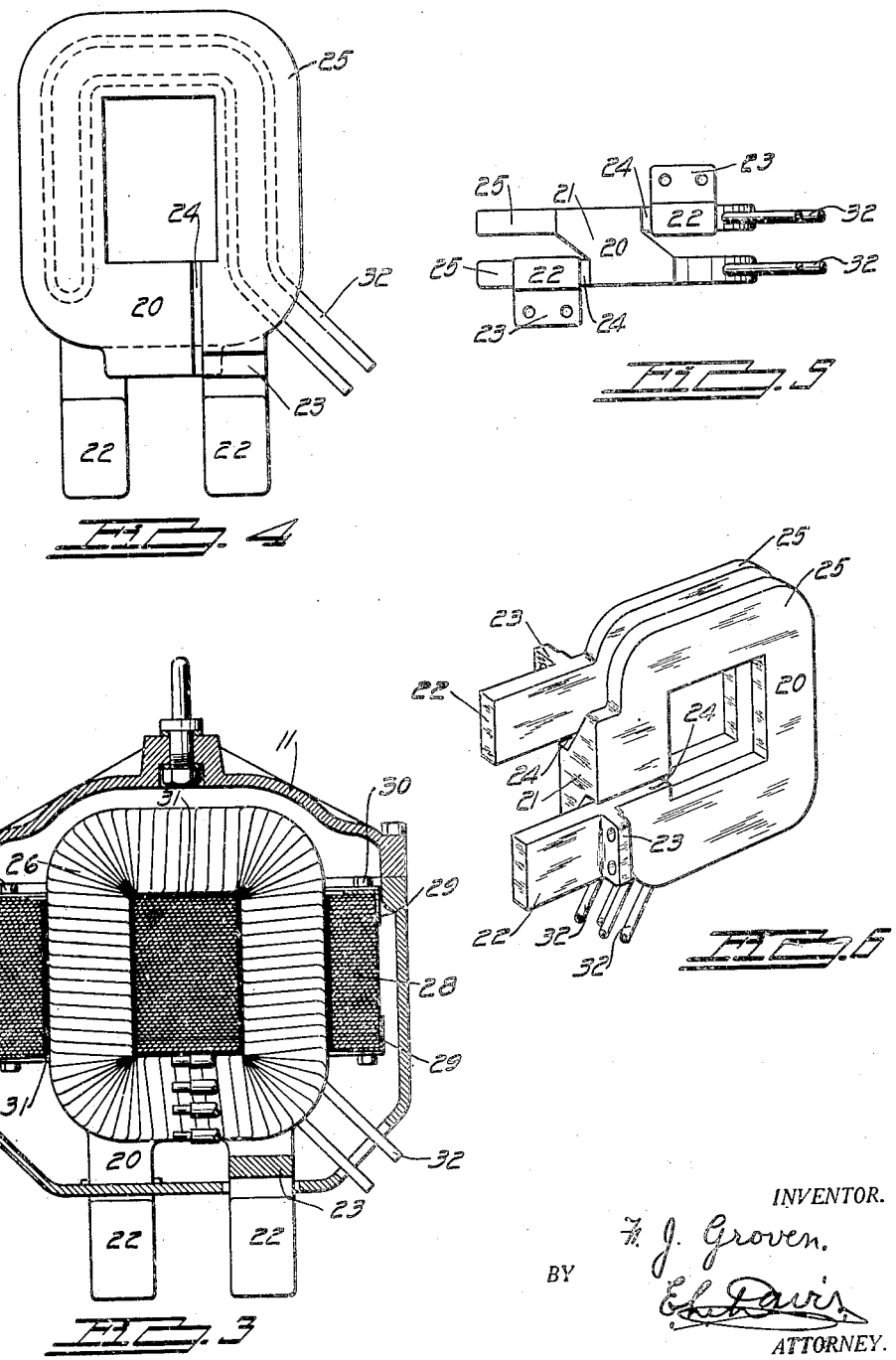

1,908,749

UNITED STATES PATENT OFFICE

FREDERICK J. GROVEN, OF HIGHLAND PARK, MICHIGAN, ASSIGNOR TO FORD MOTOR COMPANY, OF DEARBORN, MICHIGAN, A CORPORATION OF DELAWARE

WELDING TRANSFORMER

Application filed December 16, 1931. Serial No. 581,375.

The object of my invention is to provide a welding transformer of novel construction which is especially adapted for use in connection with a portable resistance welding machine. Welding machines of this type are generally used to produce spot welds and consist of the transformer which is located adjacent to the work to be welded and a welding head which is manipulated around the work. The primary winding of the transformer is connected with a current source and a pair of flexible secondary leads extending from the transformer to a portable welding head. The welding head is essentially a pair of electrodes each of which is connected to one of the secondary leads. These electrodes are brought together through some suitable actuating device so that the electrodes may be operatively clamped down over the sheets to be welded. Due to the ease with which the head is manipulated, this machine is especially suitable for use in welding automobile bodies and the like where it is difficult to hold the body in a conventional spot-welding machine. It is essential, or at least very desirable, that transformers for this use be light in weight and compact so that it may be suspended to swing freely and follow the movements of the operator.

A further object of my invention is to provide a transformer having a two-turn secondary winding to thereby produce a secondary voltage of substantially the value of that used in the ordinary welding machine. Heretofore all welding transformers with which the applicant is familiar were provided with secondary windings of a single turn, which windings were composed of a liminated sheet copper strip threaded through the core. Due to the unwieldiness of such strip, it was impractical to provide more than one turn thereof around the transformer so that when higher voltages were required it was necessary to short circuit a portion of the primary winding to thus obtain the desired ratio of the windings. The disadvantage of such structure was that when higher voltages were required a much larger transformer was required. The use of a portable welding machine necessitates a higher secondary voltage, due to the current drop in the relatively small secondary leads to the welding head.

No claim is made herein that the efficiency or ratio of the current input to current output in my transformer is substantially different from other well constructed transformers, but it is claimed that where a high amperage secondary current output of substantially eight volts is required, it can be provided with my transformer with considerably less weight than was heretofore possible with a single-turn winding.

Still a further object of my invention is to provide a welding transformer in which the core laminations and primary windings are totally supported by the secondary winding to thereby form both a cheaper and better construction.

With these and other objects in view, my invention consists in the arrangement, construction and combination of the various parts of my improved device, as described in the specification, claimed in my claims, and illustrated in the accompanying drawings, in which:

Figure 1 shows a side elevation of my improved transformer.

Figure 2 shows a sectional view, taken on the lines 2—2 of Figure 1.

Figure 3 shows a sectional view, taken on the line 3—3 of Figure 2.

Figure 4 shows a plan view of my improved secondary windings.

Figure 5 shows a bottom view of the winding shown in Figure 4.

Figure 6 shows a perspective view of a secondary winding shown in Figures 4 and 5.

Figure 7 shows a side elevation of one type of welding head adapted for use with my improved device, and Figure 8 shows an electrical wiring diagram of my transformer.

Referring to the accompanying drawings, I have used the reference numeral 10 to indicate a box-shaped transformer housing, preferably cast from aluminum, which is provided with a cover member 11 adapted to form a closure for the upper side thereof. The housing 10 is provided with a rectangular-shaped opening in one of its sides and a terminal plate of insulating material 12 is secured to the housing 10 over this opening, this terminal plate having a plurality of terminals 13 secured therein so that the various connections of my transformer may be readily made. A cover member 14 is secured to the housing 10 over the plate 12 to thereby complete the enclosure of the housing 10. The cover member 14 is provided with a pair of shafts 15 rotatably mounted therein, each of which shafts is provided with an arm 16 secured to its outer end which has a handle 17 secured to the free end of each arm. Switch blades 18 are secured to and extend radially from the inner end of each shaft 15 and springs 19 are disposed around the shafts 15 to resiliently urge the arms and shafts into contact with certain of the terminals 13 on the plate 12. In order to position the switches each of the handles 17 are secured to spring-operated plungers in the end of the arms 16, which plungers are resiliently urged into suitable openings in the cover member 14 so that the several positions of the handles may be readily selected.

My transformer is built around a double-turn secondary winding and, referring to Figures 4, 5 and 6, this winding is seen to consist of a single casting, preferably formed of aluminum although copper may be used if desired, which casting is fastened to the bottom of the housing 10. This secondary winding, which I have designated generally by the numeral 20, is cast in the form of two axially spaced annular rings 25 somewhat rectangular shaped having an integral bar 21 connecting the peripheries of the lower portions of each ring. A secondary terminal 22 projects radially and downwardly from the bottom of each ring, one on each side the bar 21, these terminals being parallel and each having a foot 23 cast integrally therewith whereby the casting may be secured in position.

The casting, as formed, is not suitable as a winding but may be converted into a double-turn winding by machining a radial slot 24 through each ring between the junction of the bar 21 and the terminal 22. Thus, current conducted to one of the terminals 22 must flow around the ring to the bar 21 and then across to the other ring and therearound to the other terminal 22 to thereby make two complete turns.

As has been previously mentioned, the rings 25 are axially spaced and are parallel to each other so that pancake-type primary winding coils 26 may be secured on each side of each ring. These windings are separated from the rings by suitable insulation 27. The coils 26 are preferably wound from flat wire or ribbon so that a compact and relatively rigid coil is formed. As will be seen from Figure 2, four of these coils are required, one on each side of each ring 25 and one of the outer coils is provided with several taps taken off at various places so that several voltages may be obtained with the transformer.

The core of my transformer consists of a plurality of transformer steel laminations 28 built up into a figure 8-shaped core, which laminations are secured together by a pair of rectangular-shaped angle iron frames 29 which are fastened together by corner bolts 30. The center crossbar of this core extends through the central opening in the rings 25 and primary coils 26. Of course, this core member is constructed from sections to build up each 8-shaped lamination and suitable strips of insulation 31 are interposed between the laminations and both the primary and secondary windings so that a compact transformer unit is provided.

It will be seen from Figure 4 that each of the rings 25 is cast with a tube 32 therein, this tube extending substantially three-quarters of the way around each ring and returning back upon itself, whereby cooling water may be conducted therethrough to effectively cool the secondary winding of the transformer.

The bottom portion of the transformer housing 10 is provided with a pair of openings therein through which the terminal 22 extends with the feet 23 bolted to the housing by means of bolts 33, these feet, of course, being insulated from the housing and the bolts. Thus, the transformer windings and core are rigidly supported in the housing independently of any other connection therewith.

It will be seen from the wiring diagram, designated by Figure 8, that the terminals 13, which are aligned with the respective shafts 19, have their inner ends connected to a pair of primary current lead wires 34 which extend up and out through suitable bushings 35 fixed in the cover 11, whereby they may be connected to any suitable current supply. As has been previously mentioned, all of the primary winding coils are connected in series and the end terminals thereof are connected to suitable terminals in the plate 12 which are arcuately spaced around the axis of each shaft 15 in position so that the switch arm 18 may operatively contact therewith to conduct the current through the total primary winding coils. Several taps are taken off the coils 26 in the conventional manner which are connected to other terminals, arcuately spaced around the shafts 15, so that by suitably positioning the switch handles 17, various portions of the primary windings may be short-circuited. No claim is made to this particular means for altering the voltage in the transformer, as the same is well known in the transformer art, but is shown and described herein merely to bring out the commercial advantage resulting from the use of this device.

If desired, my improved transformer may be used with any type of welding machine, however, it is particularly adapted for use with a portable welder, one form of which is shown herein in Figure 7. With this device a pair of flexible heavy lead wires 36 are secured to the terminals 22 which extend to the welding head of the device. This welding head consists of an air-operated cylinder 37 having a handle 38 formed on one end thereof. An arm 39 is fastened to the cylinder 37 and insulated therefrom by insulation 40 and the other end of this arm is provided with an electrode 41 aligned with the axis of the air cylinder. A plunger 42 projects forwardly from the cylinder 37, upon the end of which a bracket 43 is secured, which bracket has a guide bar 44 associated therewith whereby reciprocation of the plunger and bracket and guide bar is permitted but rotation thereof is prevented. A second electrode 45 is mounted in the bracket 43 in position aligned with the electrode 41 and an air valve 46 is located in the handle so that operation of this valve will force the electrodes together. Both the arm 39 and bracket 43 are each provided with a threaded opening 47 whereby terminals on the free ends of the lead wires 36 may be connected to the respective electrodes of the device.

Among the many advantages resulting from the use of my improved device, it may be well to mention that I have provided a novel type secondary winding for my transformer which not only comprises two complete turns around the core, but which may be constructed as a relative simple casting, and with a minimum of machine work this casting may be converted into a double-turn winding.

Still a further advantage results from the use of my improved device in that the secondary winding supports the completed transformer so that brackets, fasteners, or other devices formerly used to support the core and windings in the transformer are eliminated.

A further advantage results from my improved device in that the use of a double-turn secondary winding results in a considerably smaller-sized unit where the output voltage is around 8 volts, which unit, being lighter, makes the device especially suitable for use in a portable machine.

Still a further advantage is believed to reside in my novel switch mechanism whereby an exceptionally durable and foolproof apparatus is obtained.

Some changes may be made in the arrangement, construction, and combination of the various parts of my improved device without departing from the spirit of my invention, and it is my intention to cover by my claims such changes as may reasonably be included within the scope thereof.

I claim as my invention:

1. A two-turn secondary winding for a transformer consisting of a pair of axially-spaced parallel open rings having a bar connecting one end of one ring with the opposite end of the other ring, terminals projecting radially from the remaining ends of the other rings, said terminals each having a foot associated therewith whereby the device is supported in a transformer housing.

2. A two-turn secondary winding for a transformer consisting of a pair of axially-spaced parallel open rings having a bar connecting one end of one ring with the opposite end of the other ring, said bar lying wholly outside of the peripheries of the rings whereby the space between said rings will accommodate pancake-type primary winding coils, and terminals projecting radially from the remaining ends of said rings, said terminals each having a foot formed integrally therewith which is disposed outside of the peripheries of the rings whereby the winding is rigidly secured in a transformer housing.

3. In a welding transformer, a two-turn secondary winding consisting of a pair of axially-spaced parallel open rings having a bar connecting one end of one ring with the opposite end of the other ring, said bar lying outside of the peripheries of said rings, terminals projecting radially from the remaining ends of said rings, means for securing said terminals in a transformer housing, a pancake-type primary winding interposed between said rings, and a laminated core disposed around said windings and supported entirely thereby in position within said housing.

4. In a welding transformer, a transformer housing a secondary winding comprising a pair of flat axially-spaced parallel open rings having a bar connecting one end of one ring with the opposite end of the other ring, said bar lying outside of the peripheries of said rings, terminals projecting radially from the remaining ends of said rings, said terminals having means associated therewith for supporting the rings in the transformer housing, a primary winding comprising a plurality of pancake-type coils axially aligned with said rings, at least one of said coils being disposed therebetween and the remaining coils on either side of the rings, and a laminated transformer core built up around said windings and supported entirely thereby within said housing.

5. In a welding transformer, a transformer housing, a secondary winding comprising a pair of axially-spaced parallel open rings having a bar connecting one end of one ring with the opposite end of the other ring, said bar lying wholly outside of the peripheries of said rings, terminals projecting radially from the remaining ends of said rings, said terminals each having a foot formed integrally therewith whereby the terminal and ring may be rigidly supported in the transformer housing, a pancake-type primary winding disposed between said ring, and a figure 8-shaped laminated core built up around said windings and supported wholly thereby.

FREDERICK J. GROVEN.